(12) United States Patent
Langan et al.

(10) Patent No.: US 6,230,238 B1
(45) Date of Patent: May 8, 2001

(54) METHOD AND APPARATUS FOR ACCESSING MISALIGNED DATA FROM MEMORY IN AN EFFICIENT MANNER

(75) Inventors: John A. Langan; Bruce L. Morton, both of Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/261,877

(22) Filed: Mar. 2, 1999

(51) Int. Cl.[7] ................................ G06F 12/00; G06F 9/24
(52) U.S. Cl. ........................ 711/109; 711/100; 712/204
(58) Field of Search ............................. 711/100, 5, 109, 711/154, 220; 712/225, 204

(56) References Cited

U.S. PATENT DOCUMENTS

| | | | |
|---|---|---|---|
| 5,577,200 | * 11/1996 | Abramson et al. | 714/50 |
| 5,748,855 | * 5/1998 | Levine et al. | 712/23 |
| 5,802,556 | * 9/1998 | Patel et al. | 711/109 |
| 6,009,510 | * 12/1999 | Henry et al. | 712/204 |
| 6,076,136 | * 6/2000 | Burroughs et al. | 711/5 |
| 6,112,297 | * 8/2000 | Ray et al. | 712/225 |

\* cited by examiner

Primary Examiner—Tuan V. Thai
(74) Attorney, Agent, or Firm—Lee E. Chastain

(57) ABSTRACT

A method and apparatus for performing mis-aligned read and write operations to a stack involves providing a memory array (110). The memory array is split into a high byte memory array (116) and a low byte memory array (112). Each memory array (112 and 116) has its own bus interface unit (114 and 118) respectively. The high byte bus interface unit (118) increments the address bits to the high byte memory array (116) on every access to compensate for mis-aligned data. However, the low byte bus interface unit (114) does not increment the address value before accessing the memory array (112). By doing so, memory is read from the memory arrays (112 and 116) in either 8 bit sizes or 16 bit sizes regardless of whether the stack structure implemented in memory array (112 and/or 116) contains aligned data or mis-aligned data.

15 Claims, 2 Drawing Sheets

METHOD AND APPARATUS FOR ACCESSING MISALIGNED DATA FROM MEMORY IN AN EFFICIENT MANNER

FIELD OF THE INVENTION

The present invention relates generally to integrated circuit (IC) designs, and more particularly to, a bus interface unit and methodology for reading aligned and mis-aligned data values from a memory array.

BACKGROUND OF THE INVENTION

In the integrated circuit (IC) industry, low cost and low power microcontroller units (MCUs) are generally designed and manufactured having an 8 bit architecture. In other words, the registers are configured in 8 bit segments (i.e., 8-bit or 16-bit registers) and the data busses that connect various peripherals and circuits within the microcontroller are 8 bits in width. Therefore, when an 8 bit microcontroller implements a stack data structure in internal or external memory for use during interrupt processing, data is written and read from the stack 1 byte at a time. For example, when an interrupt occurs, a microcontroller may push nine bytes sequentially to a stack data structure in a time serial manner via nine push operations in order to save the state of the microcontroller before processing the interrupt. In order to return, the state of the machine after the interrupt processing is complete, nine sequential pop operations are used to restore the state of the machine.

In recent years, microcontrollers have been used in applications that require significantly more processing power. In order to obtain greater processing power, 8 bit or byte wide microcontroller architectures are now being progressed to 16 bit software compatible architectures with 16 bit busing. In doing so, a 16 bit stack structure is typically created in internal or external memory to allow for interrupt processing. In this 16-bit architecture, the CPU is able to write two bytes (16 bits) to the stack structure with a single instruction. Therefore, while 8 bit stack structures would take nine operations to write nine bytes to the stack memory, a 16 bit stack will require only five operations to write nine bytes of memory to the stack (i.e., four 16-bit write operations and one byte write).

However, a 16 bit stack that is written with an odd number of bytes (e.g., nine bytes) will result in misalignment of the next push operation since the last of the nine bytes written to the stack will only use the low order byte of that last 16 bit position in the stack while the high order byte is the next available location in the stack. A subsequent push of information to this stack will result in some 16 bit values being written in to odd addresses of the stack instead of even addresses where the high and low bytes of the 16 bit words are mis-aligned (i.e., not located beginning at even addresses). In order to handle such misalignment, architectures typically access the 16 bit stack structure by performing individual byte reads where nine memory operations are still required to retrieve nine bytes of information off of the 16-bit stack. Therefore, the 16 bit stack structure still suffers from the same performance as the older 8 bit stack technology due to the misalignment of data during push and pop operations of odd numbers of bytes. In addition, while stack pushes that were aligned beginning at an even address could be read off the stack in five 16-bit reads, other pushes that were made in a mis-aligned manner (starting at an odd address) would require nine byte reads. Therefore, the initiation of an interrupt and the recovery from an interrupt could consume a different amount of CPU clocks cycles depending upon the circumstances and status of the stack. This would adversely affect a software engineer's ability to perform adequate cycle counting operations in order to develop efficient software code. Therefore, using byte access mechanisms into a 16 bit stack memory to handle misaligned data was not advantageous, and offered very little improvement over prior 8 bit structures.

In order to obtain approved performance for mis-aligned pushes to a 16 bit stack, engineers have attempted to develop custom memory arrays for embedded use. However, memory arrays for microcontroller applications are generated automatically by a computer tool whereby design times of microcontrollers and time to market are greatly improved. If custom memory array designs are needed to handle mis-aligned memory accesses, then time to market and the MCU design cycle time is adversely affected.

Therefore, a need exists in the industry for an effective way of implementing a 16 bit wide stack in an 8 bit microcontroller environment whereby mis-aligned pushes and pops can be accomplished in a uniform and short same time period, the same as aligned push and pop operations.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
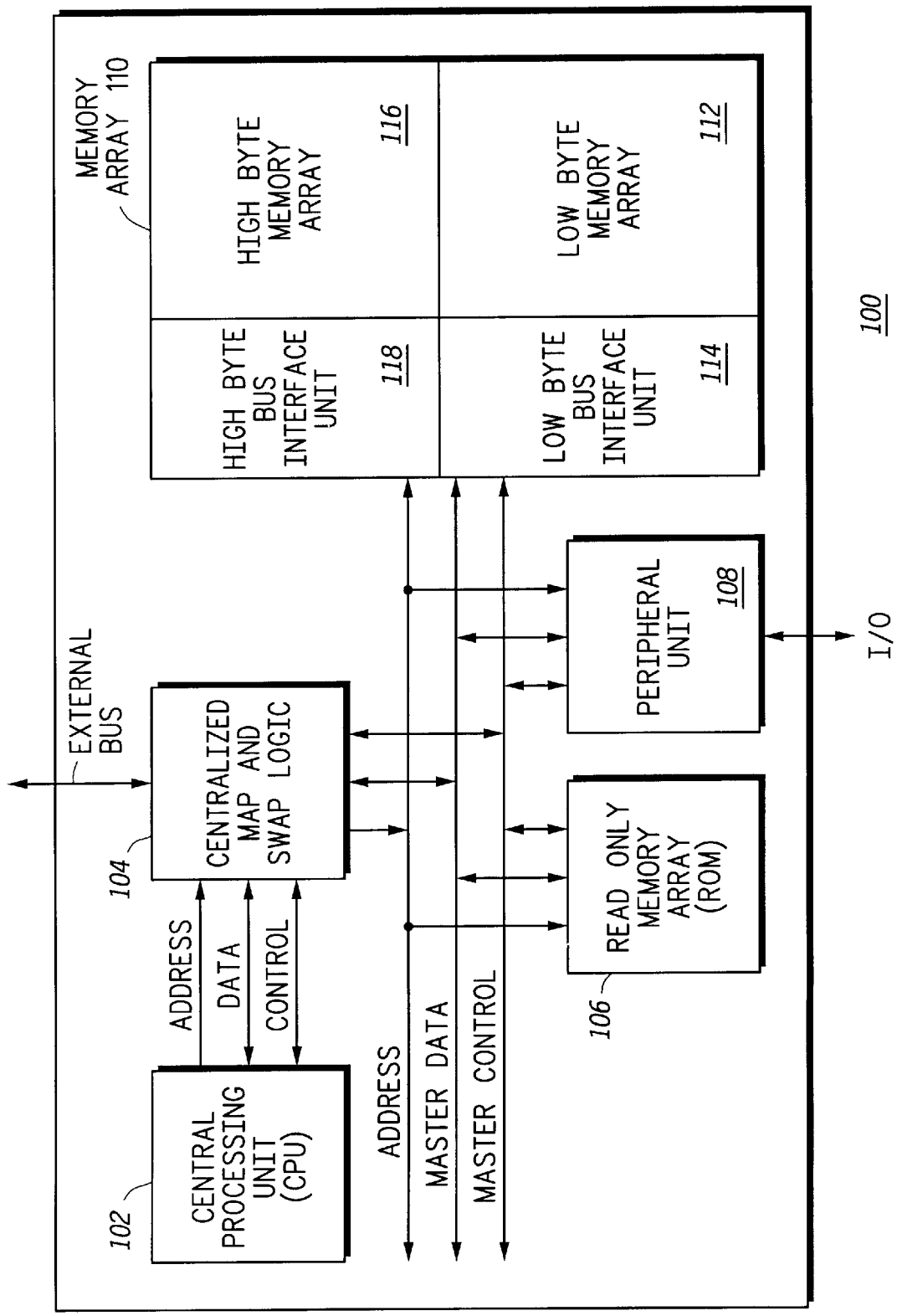
FIG. 1 depicts a block diagram of a data processor constructed in accordance with the present invention.

FIG. 1 depicts a block diagram of a data processor 100 constructed in accordance with the present invention. Data processor 100 incorporates circuitry for reading from and writing to a memory array. This circuitry accesses two consecutive memory locations in a single cycle independent of whether the two locations begin on an address ending in zero (an "even" address) or begin on an address ending in one (an "odd" address). Consequently, the overall performance of the data processor is improved. Furthermore, the memory access time of the data processor is independent of the access addressed. This consistency simplifies programming if a user bases actions on instruction cycle count. Also, the disclosed circuitry may be used with any standard memory array without modifying the array. This feature makes the disclosed invention useful with a wide variety of memory designs and design methodologies.

Continuing with FIG. 1, data processor 100 includes a central processing unit (CPU) 102, a centralized map and swap logic 104, a block of read only memory (ROM) 106, a peripheral unit 108, a memory array 110. Memory array 110 further includes a low byte memory array 112, a low byte bus interface unit 114, a high byte memory array 116, and a high byte bus interface unit 118. Data processor 100 communicates with external devices via an external bus and an input/output (I/O) bus. Centralized map and swap logic 104 generates the external bus. Peripheral unit 108 generates the I/O bus.

In operation, CPU 102 executes instructions stored in ROM 106 operating upon operands stored in memory array 110. In other embodiments, instructions may be stored in memory array 110 or in an external memory array (not shown) via the external bus. Further, operands may be stored in ROM 106, in the external memory array, or may be provided via peripheral unit 108. CPU 102 can perform a wide variety of control functions through peripheral unit 108, including data communication, timing control, digital-to-analog signal interface, etc. In the described embodiment, CPU 102 generates a sixteen-bit ADDRESS bus, a sixteen-bit DATA bus, and a multi-signal CONTROL bus. These signals control the CPU's memory mapped transactions.

Centralized map and swap logic 104, buffers and routes memory mapped transactions between CPU 102 and the external bus, ROM 106, peripheral unit 108, and memory array 110. Centralized map and swap logic 104 generates a set of MASTER CONTROL signals, a MASTER DATA bus, and passes through the ADDRESS bus to ROM 106, peripheral unit 108, and memory array 110. The MASTER CONTROL signals enable and control the various devices to which they are connected. The MASTER CONTROL signals include multiple DEVICE SELECT signals, a SIZE signal, and a READ/WRITE signal. These signals are further described below in connection with FIG. 2. The MASTER DATA bus contains the same data as does the DATA bus. However, centralized map and swap logic 104 routes data among byte lanes within the MASTER DATA bus when necessary. Data routing is necessary when the data is associated with an odd address. In these cases, centralized map and swap logic 104 swaps the high and low data bytes. This swapping places the data into the position expected by CPU 102.

Figures 2, 3:
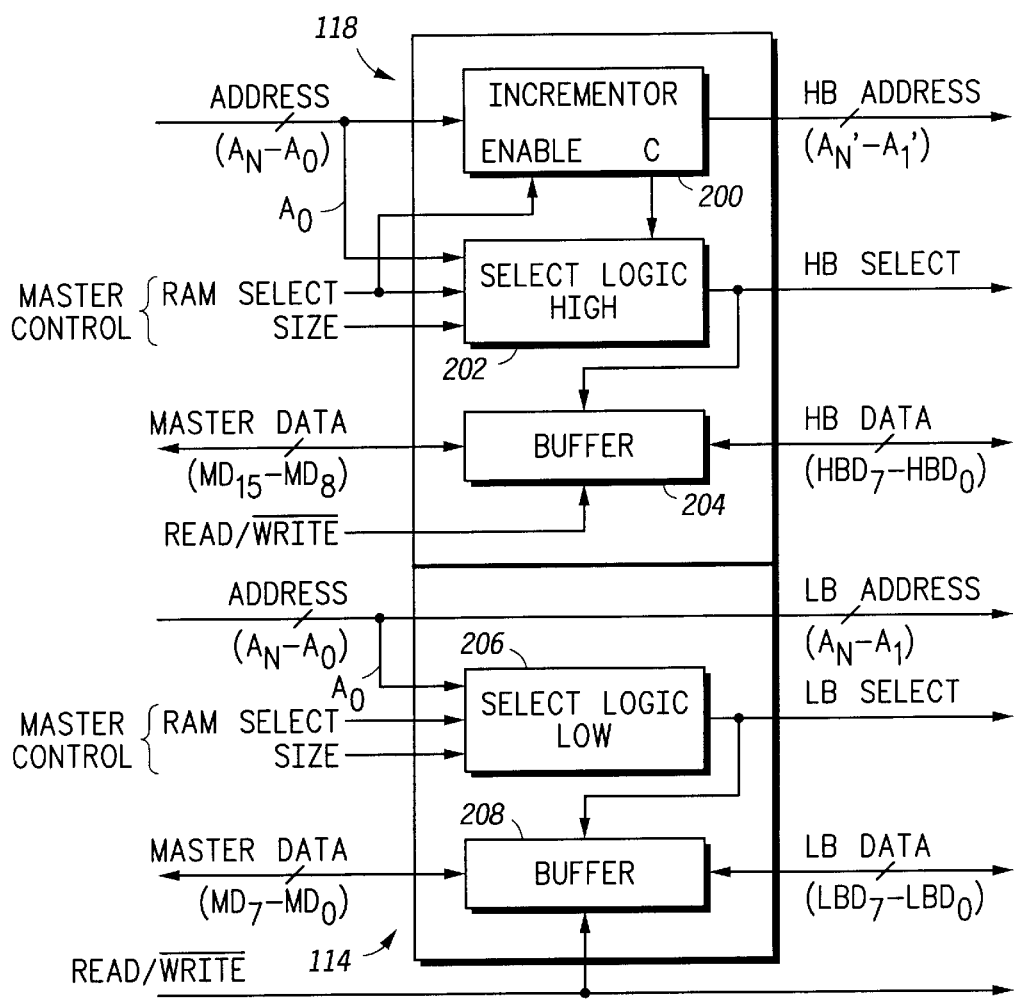
FIG. 2 depicts a block diagram of the high byte bus interface unit and the low byte bus interface unit depicted in FIG. 1.
FIG. 3 depicts a conceptual view of a memory space useful in the explanation of the invention.

FIG. 2 depicts a block diagram of the high byte bus interface unit 118 and the low byte bus interface unit 114 depicted in FIG. 1. High byte bus interface unit 118 controls the operation of high byte memory array 116. Similarly, low byte bus interface unit 114 controls the operation of low byte memory array 112. FIG. 2 depicts the following control signals:

$\underline{C}$ When asserted, indicates that a sixteen-bit (word) memory access is to the last byte address in the memory space allocated to memory array 110. Otherwise, the memory access is to some other address.
RAM SELECT
When asserted, RAM SELECT indicates that a memory access is targeted to memory array 110. Otherwise, an access, if any, is targeted to another memory mapped device.
READ/WRITE
When asserted, READ/WRITE indicates that a memory access is to read data from memory array 110. Otherwise, a memory access is to write data to memory array 110.
SIZE
When SIZE is asserted, a memory access is reading or writing an eight-bit (byte) quantity. Otherwise, an access is to a word quantity.

High byte bus interface unit 118 includes an incrementor 200, a select logic high block 202, and a buffer 204. Incrementor 200 receives the ADDRESS bus signals, $A_N$–$A_0$ and the MASTER CONTROL signal RAM SELECT and generates a set of signals HB ADDRESS, $A_N'$–$A_1'$, and an overflow carry out signal, C. Incrementor 200 adds one to the value input on ADDRESS and outputs the sum on HB ADDRESS. Incrementor 200 outputs the overflow carry bit, C, to select logic high block 202. Select logic high block 202 receives the ADDRESS bus signal, $A_0$, and the MASTER CONTROL signals RAM SELECT and SIZE and generates a control signal HB SELECT. The control signal HB SELECT is given by the equation:

$$\text{HB SELECT} = \text{RAM SELECT} * \overline{C} * (\overline{\text{SIZE}} + \text{SIZE} * \overline{A_0}) \qquad \text{Eq. 1}$$

Buffer 204 is coupled to the upper half of the MASTER DATA bus signals, $MD_{15}$–$MD_8$, the MASTER CONTROL signal READ/WRITE, the control signal HB SELECT, and to the high byte data bus, HB DATA, $HBD_7$–$HBD_0$. When enabled by the output of select logic high block 202, buffer 204 buffers data between centralized map and swap logic 104 and high byte memory array 116. The logic state of the control signal READ/WRITE indicates whether buffer 204 directs data from memory array 110 to centralized map and swap logic 104 (read) or whether buffer 204 directs data from centralized map and swap logic 104 to memory array 110 (write).

Low byte bus interface unit 114 includes a select logic low block 206 and a buffer 208. Select logic low block 206 receives the ADDRESS bus signal, $A_0$, and the MASTER CONTROL signals RAM SELECT and SIZE and generates a control signal LB SELECT. The control signal LB SELECT is given by the equation:

$$\text{LB SELECT} = \text{RAM SELECT} * (\overline{\text{SIZE}} + \text{SIZE} * A_0) \qquad \text{Eq. 2}$$

Buffer 208 is coupled to the lower half of the MASTER DATA bus signals, $MD_7$–$MD_0$, the MASTER CONTROL signal READ/WRITE, the control signal LB SELECT, and to the low byte data bus, LB DATA, $LBD_7$–$LBD_0$. The logic state of the control signal READ/WRITE indicates whether buffer 208 directs data from memory array 110 to centralized map and swap logic 104 (read) or whether buffer 208 directs data from centralized map and swap logic 104 to memory array 110 (write).

The MASTER CONTROL signal READ/WRITE also passes through high byte bus interface unit 118 and low byte bus interface unit 114 directly to high byte memory array 116 and low byte memory array 112.

FIG. 3 depicts a conceptual view of a memory space useful in the explanation of the invention. Here, CPU 102 has performed two "push" operations. In a push operation, CPU 102 stores the contents of certain internal registers prior to executing an interrupt routine. Later, the values are read or "popped" from memory array 110 back to the original register locations. This pair of operations preserves the state of processor during an exception or interrupt. Typically, a push operation is followed closely by a pop operation. However, it is possible for a second interrupt and, hence, a second push, to occur prior to the first pop. This case is depicted in FIG. 3.

In the depicted embodiment, CPU 102 stores each internal register into the location specified by a "stack pointer." During this process, the stack pointer is decremented. Here, the first register from the first push operation is stored at memory location 16(decimal). The next register is then stored into the next adjacent memory location. This process continues until all registers are saved. As depicted, CPU 102 stores six internal registers into memory: Program Counter (high byte), $PC_{HI}$, Program Counter (low byte), $PC_{LO}$, X Index Register (high byte), $X_{HI}$, X Index Register (low byte), $X_{LO}$, Y Index Register (high byte), $Y_{HI}$, Y Index Register (low byte), $Y_{LO}$. A Accumulator, A, B Accumulator, B, and a Condition Code Register, CCR. The program counter and two index registers are sixteen-bit quantities. The two accumulators and condition code register are eight-bit quantities. The total stack requires nine-bytes of storage. The second push operation begins at memory address 8(decimal).

The first push operation will require four word accesses and one byte access to save the entire stack. Each type of access requires a single cycle to accomplish. In total, the first push operation requires five clock cycles. However, the second push operation begins as four mis-aligned word accesses. Each of these accesses requires two cycles without the disclosed invention. In total, the second push operation could require nine separate accesses. As described below, low byte bus interface unit 114 and high byte bus interface unit 118 perform aligned and mis-aligned accesses in a single cycle. Therefore, both push operations require five clock cycles.

The two bus interfaces depicted in FIG. 2 perform one of four possible memory access: (1) a single byte even access, (2) a single byte odd access, (3) a word (two byte) aligned, and (4) a word mis-aligned access. A read access and a write access are substantially similar with respect to low byte bus interface unit 114 and high byte bus interface unit 118. Therefore, the operation of the disclosed invention will be described with respect to four different write accesses.

Single Byte Even Access

An example of a single byte even access is the push of the condition code register to memory address 0 in the second push operation. In a single byte even access write, centralized map and swap logic 104 places an eight-bit datum on the upper eight bits of the MASTER DATA bus, $MD_{15}$–$MD_8$, places an even address (ending with a zero) on ADDRESS bus, $A_N$–$A_0$, asserts RAM SELECT, asserts SIZE, and de-asserts READ/WRITE. Incrementor 200 will increment the address present on the ADDRESS BUS by one. By definition, the least significant address bit of an even address is zero. Therefore, the second least significant bit $A_1'$ and all higher bits will not change. The HB ADDRESS equals ADDRESS. Also by definition, the overflow carry bit, C, will be de-asserted. Equation 1 above results in a high logic value for HB SELECT. HB SELECT and HB ADDRESS cause the upper eight-bits of MASTER DATA bus, $MD_{15}$–$MD_8$ to be written to high byte memory array 116. Conversely, equation 2 results in a low logic value for LB SELECT. No data is written to low byte memory array 112. In this example, the CCR is written to address 0.

Single Byte Odd Access

An example of a single byte odd access is the push of the condition code register to memory address 9 in the first push operation. In a single byte odd access write, centralized map and swap logic 104 places an eight-bit datum on the lower eight bits of the MASTER DATA bus, $MD_7$–$MD_0$, places an odd address (ending with a one) on ADDRESS bus, $A_N$–$A_0$, asserts RAM SELECT, asserts SIZE, and de-asserts READ/WRITE. Equation 1 above results in a low logic value for HB SELECT. Therefore, no data is written to high byte memory array 116. Conversely, equation 2 results in a high logic value for LB SELECT. LB SELECT and LB ADDRESS cause the lower eight-bits of MASTER DATA bus, $MD_7$–$MD_0$ to be written to low byte memory array 112. In this example, the CCR is written to address 9.

Word Aligned Access

An example of a word aligned access is the push of the program counter to memory address 16 in the first push operation. In a word aligned access write, centralized map and swap logic 104 places a sixteen-bit datum on the MASTER DATA bus, $MD_{15}$–$MD_0$, places an even address (ending with a zero) on ADDRESS bus, $A_N$–$A_0$, asserts RAM SELECT, de-asserts SIZE, and de-asserts READ/WRITE. Incrementor 200 will increment the address present on the ADDRESS BUS by one. By definition, the least significant address bit of an even address is zero. Therefore, the second least significant bit $A_1'$ and all higher bits will not change. The HB ADDRESS equals ADDRESS. Also by definition, the overflow carry bit, C, will be de-asserted. Equation 1 above results in a high logic value for HB SELECT. HB SELECT and HB ADDRESS cause the upper eight-bits of MASTER DATA bus, $MD_{15}$–$MD_8$ to be written to high byte memory array 116. Equation 2 also results in a high logic value for LB SELECT. LB SELECT and LB ADDRESS cause the lower eight-bits of MASTER DATA bus, $MD_7$–$MD_0$ to be written to low byte memory array 112. In this example, $PC_{HI}$ and $PC_{LO}$ are written to address 16 and address 17, respectively.

Word Mis-Aligned Access

An example of a word mis-aligned access is the push of the program counter to memory address 7 in the second push operation. In a word mis-aligned access write, centralized map and swap logic 104 places a sixteen-bit datum on the MASTER DATA bus, $MD_{15}$–$MD_0$, places an odd address (ending with a one) on ADDRESS bus, $A_N$–$A_0$, asserts RAM SELECT, de-asserts SIZE, and de-asserts READ/WRITE. In this case, centralized map and swap logic 104 places $PC_{HI}$ on $MD_7$–$MD_0$ and places $PC_{LO}$ on $MD_{15}$–$MD_8$. Incrementor 200 will increment the address present on the ADDRESS BUS by one. By definition, the least significant address bit of a mis-aligned address is one. Therefore, at least one of the upper address bits will change. The HB ADDRESS equals (ADDRESS+1). Depending upon the value of (ADDRESS+1), the overflow carry bit C may or may not be asserted.

If the overflow carry bit, C, is de-asserted, then the word access can complete fully. In this case, Equation 1 results in a high logic value for HB SELECT. HB SELECT and HB ADDRESS cause the upper eight-bits of MASTER DATA bus, $MD_{15}$–$MD_8$ to be written to high byte memory array 116. Equation 2 also results in a high logic value for LB SELECT. LB SELECT and LB ADDRESS cause the lower eight-bits of MASTER DATA bus, $MD_7$–$MD_0$ to be written to low byte memory array 112. In this example, $PC_{HI}$ and $PC_{LO}$ are written to address 7 and address 8, respectively.

If the overflow carry bit, C, is asserted, then the word access can not complete fully. Specifically, the high byte memory array 116 cannot be written. In the present example (writing the PC to address 7), consider that the memory size is defined as 8 bytes with address 7 being the last address. This means that $A_N=A_2$, and for address 7, $A_2=1$, $A_1=1$, and $A_0=1$. When this address is processed by incrementor 200, it produces the new bit pattern: $A'_2=0$, $A'_1=0$, and $C=1$. Equation 1 results in a low logic value for HB SELECT. HB SELECT, in turn, causes the upper eight-bits of the MASTER DATA bus, $MD_{15}$–$MD_8$, to be blocked, causing no write to high byte memory array 116. Equation 2 results in a high logic value for LB SELECT. LB SELECT and LB ADDRESS, in turn, cause the lower eight bits of the MASTER DATA bus, $MD_7$–$MD_0$, to be written to low byte memory array 112.

In this example, the only write performed is the write of $PC_{HI}$ to address 7. If the overflow carry C did not block the write to high byte memory array 116, a write to address 0 would have erroneously occurred. Use of the overflow carry C prevents erroneous writes to memory arrays that are binarily sized (i.e.: 2, 4, 8, 16, etc.). In the event of a memory array which is not binarily sized, erroneous writes may be prevented by using a full decode of the memory array.

Although the present invention has been described with reference to a specific embodiment, further modifications and improvements will occur to those skilled in the art. For instance, the disclosed invention may be physically separate from the data processor, from the memory array, or from both. Also, the invention may be extended to different size data structures and busses. For instance, the disclosed invention may be used in a 32-bit system supporting both eight-bit and sixteen-bit data types. It is to be understood therefore, that the invention encompasses all such modifications that do not depart from the spirit and scope of the invention as defined in the appended claims.

What is claimed is:

1. An apparatus comprising:
    a processing unit;
    a first memory array coupled to the processing unit through a first bus interface unit;
    a second memory array coupled to the processing unit through a second bus interface unit;
    wherein the second bus interface unit contains logic that selectively accesses memory locations within the second memory array based upon: (1) a size of a data value being accessed; and (2) one or more low order bits of an address, so that aligned data values and mis-aligned data values stored within both the first and second memory arrays are accessed from the first and second memory arrays in substantially equal time intervals;
    wherein the first and second memory arrays can read and write in one of four modes, the four modes being: (1) a byte low mode wherein a byte of data is read exclusively from the first memory array; (2) a byte high mode wherein a byte of data is read exclusively from the second memory array; (3) an aligned multi-byte mode wherein a least significant byte is read from the first memory array and a more significant byte is read from the second memory array; and (4) an mis-aligned multi-byte mode wherein a more significant byte is read from the first memory array and a lesser significant byte is read from the second memory array;
    wherein the more significant byte and the lesser significant byte are swapped in position on a date bus that is used to read values from the first and second memory arrays.

2. The apparatus of claim 1 wherein the first bus interface unit is accessed when a memory select control signal is asserted and either: (1) a size control signal indicates that a large data value is to be accessed from more than one memory array; or (2) that a small data value with fewer bits than the large data value is to be accessed while the one or more low order bits of the address are in a first state.

3. The apparatus of claim 2 wherein the second bus interface unit is accessed when a memory select control signal is asserted and either: (1) a size control signal indicates that a large data value is to be accessed from more than one memory array; or (2) that a small data value with fewer bits than the large data value is to be accessed while the one or more low order bits of the address are in a second state.

4. The apparatus of claim 1 wherein the first and second memory arrays implements a stack structure where N bits data values and 2N bits values may be stored in the stack structure with N being a finite positive integer, the 2N bits values having a high order half and a low order half wherein an aligned data value has the low order half stored in the first memory array and the high order half is stored in the second memory array and mis-aligned data value has the low order half stored in the second memory array and the high order half is stored in the first memory array.

5. The apparatus of claim 1 wherein the second bus interface unit comprises:
    an addition circuit for receiving an address value and providing an output address value to the second memory array that is different from the address value;
    select logic for receiving a size value, and one or more low order address bits, the select logic decoding the size value and the one or more low order address bits to provide a select control signal to the second memory array; and
    a buffer circuit for accepting and providing read and write data to and from the second memory array as a function of the output address value and the select control signal.

6. The apparatus of claim 5 wherein the addition circuit is an incrementor that increments the address value for each access whereby the most significant bits of the address are the same as the output address value when doing an aligned data access while the most significant bits of the address differs by one from the output address value when doing a mis-aligned data access.

7. The apparatus of claim 5 wherein the addition circuit is a decrementor that decrees the address value for each access whereby the most significant bits of the address are the same as the output address value when doing an aligned data access while the most significant bits of the address differs by one from the output address value when doing a mis-aligned data access.

8. The apparatus of claim 5 wherein the addition circuit outputs a carry out signal that is used by the select logic to ensure that a mis-aligned access to a top word in memory is correctly processed.

9. An apparatus comprising:
    a memory array;
    a bus interface unit coupled to the memory array, the bus interface unit comprising:
        an addition circuit for receiving an address value and providing an output address value to the memory array that is different from the address value;
        select logic for receiving a size value, and one or more low order address bits, the select logic decoding the size value and one or more low order address bits to provide a select control signal to the memory array; and
        a buffer circuit for accepting and providing read and write data to and from the memory array as a function of the output address value and the select control signal;
        wherein the addition circuit increments or decrements the address value for each access whereby the most significant bits of the address value are the same as the output address value when doing an aligned data access while the most significant bits of the address value differs by one from the output address value when doing a mis-aligned data access; and
        wherein a processing unit coupled to the memory array by a data bus switches high order and low order bytes read on the data bus when data read from the memory array is mis-aligned.

10. The apparatus of claim 9 wherein the addition circuit outputs a carry out signal that is us the select logic to ensure that a mis-aligned access to a top word in memory is correctly processed.

11. The apparatus of claim 9 wherein the bus interface unit receives a memory select control signal.

12. The apparatus of claim 9 wherein the bus interface unit receives a memory select control signal that enables the bus interface unit for specific accesses.

13. A method for reading a data value from memory wherein the memory is segmented into a high order array and a low order array and wherein data is mis-aligned when a low order portion of the data value is stored in the high order array and a high order portion of the data value in the low order array, the method comprising the steps of:
    providing an address to a low order bus interface unit coupled to the low order array and a high order bus interface unit coupled to the high order array;

providing a size control signal to the low order bus interface unit and the high order bus interface unit;

passing the address through the low order bus interface unit to the low order array without mathematical manipulation while incrementing the address through the high order bus interface unit to pass an incremented address to the high order array;

using the address in the low order array to access the high order portion of the data value from the low order array while using the incremented address in the high order array to access the low order portion of the data value from the high order array; and using control circuitry to switch the high order portion and low order portion to their respective proper positions on a physical data bus.

14. The method of claim 13 further comprising the step of:

generating a carry out signal when incrementing the address through the high order bus interface unit; and using the carry out signal to detect when a mis-aligned access is occurring at a top of the memory whereby the high order array is not accessed in response to generation of the carry out signal.

15. The method of claim 13 further comprising the steps of:

reading the data value from the low order and high order memory array on a first data bus and writing data to the low order and high order memory array on a second data bus.

* * * * *

UNITED STATES PATENT AND TRADEMARK OFFICE
CERTIFICATE OF CORRECTION

PATENT NO. : 6,230,238 B1
DATED : May 8, 2001
INVENTOR(S) : John Adolphe Langan et al.

It is certified that error appears in the above-identified patent and that said Letters Patent is hereby corrected as shown below:

<u>Column 8, claim 7,</u>
Line 15, after "that"; change "decrees" to -- decrements --

<u>Column 8, claim 10,</u>
Line 51, after "is"; insert -- used by --

Signed and Sealed this

Thirteenth Day of November, 2001

*Attest:*

NICHOLAS P. GODICI
*Attesting Officer*    *Acting Director of the United States Patent and Trademark Office*